Figure 1:
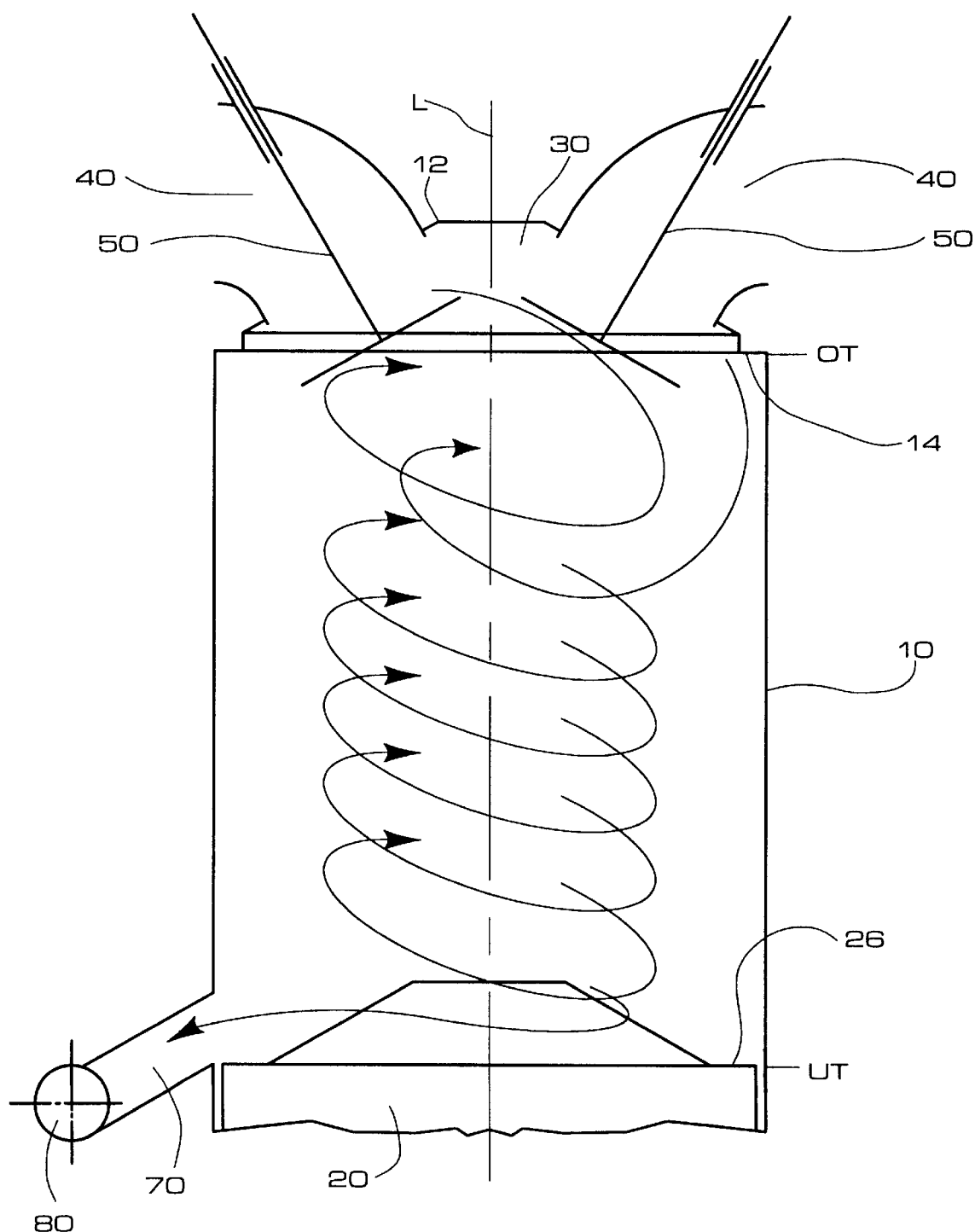

United States Patent [19]
König

[11] Patent Number: 5,934,262
[45] Date of Patent: Aug. 10, 1999

[54] COMBUSTION CHAMBER FOR INTERNAL COMBUSTION ENGINE

[76] Inventor: Kurt König, Am Kappengrund 32, 86946 Vilgertshofen-Issing, Germany

[21] Appl. No.: 09/023,342

[22] Filed: Feb. 13, 1998

Related U.S. Application Data

[62] Division of application No. 08/652,583, filed as application No. PCT/EP94/04061, Dec. 6, 1994, Pat. No. 5,738,050.

[51] Int. Cl.$^6$ .......................................................... F02F 3/28
[52] U.S. Cl. ........................ 123/661; 123/664; 123/193.6
[58] Field of Search .................................... 123/661, 664, 123/667, 193.6

[56] References Cited

U.S. PATENT DOCUMENTS

| | | | |
|---|---|---|---|
| 4,162,661 | 7/1979 | Nakanishi et al. | 123/661 |
| 4,324,214 | 4/1982 | Garcea | 123/661 |
| 5,127,379 | 7/1992 | Kobayashi et al. | 123/661 |
| 5,195,488 | 3/1993 | Rattigan | 123/661 |

*Primary Examiner*—Marguerite McMahon
*Attorney, Agent, or Firm*—Mallinckrodt & Mallinckrodt

[57] ABSTRACT

A combustion chamber in a reciprocating-piston internal combustion engine having at least one inlet duct and at least one outlet duct is formed by a cylinder head and piston each having respective annular squish surfaces for acceleration of fresh gases. A mixture guide element having a recess in its top adjoins the piston crown and the inlet duct to the cylinder is arranged to cause fresh gases to flow with a circulatory movement into the combustion chamber. The configuration increases power output while reducing pollution emissions.

8 Claims, 6 Drawing Sheets

COMBUSTION CHAMBER FOR INTERNAL COMBUSTION ENGINE

RELATED APPLICATIONS

This is a divisional application of U.S. application Ser. No. 652,583 having a filing date of Oct. 23, 1996, now U.S. Pat. No. 5,738,050 as the U.S. National Phase of PCT/EP94/04061 filed Dec. 6, 1994.

The invention concerns a combustion chamaber for reciprocating-piston internal combustion engines as set fort in the classifying portion of claim 1.

The requirements made in respect of reciprocating-piston internal combustion engines are a low level of pollutant emission and a low specified fuel consumption, that is to say, little fuel is to be burnt. The following conditions must be observed in order to satisfy those requirements: a high level of fresh gas acceleration, a high fresh gas speed, turbulence-free flow, a deflector surface on the piston crown, a guide element for fresh gases, a combustion chamber in the cylinder head and in the piston crown, concentration of the fresh gases in the center of the combustion chamber, a high degree of compression, and rapid combustion.

German patent specification No. 32 24 337 describes a piston with a spherical squish gap and a combustion chamber which is partially formed in the piston crown. The spherical configuration of the piston crown is to accelerate the potential flow of the fresh gases in the compression stroke, while at the same time there is a rotational flow circulating in the same direction in the direction of the cylinder axis, but in the opposite direction in relation thereof. At the top dead center point the potential flow is urged into the combustion chamber by the spherical squish surface. When that happens the particles of fuel which are disposed in the outer edge region of the potential flow are also conveyed inwardly. A rich mixture is formed in the combustion chamber at the edge of the rotational flow, and is fired by two spark electrodes. Due to the piston crown being advantageous in terms of flow configuration, the fuel particles of the potential flow are in the region of the cylinder wall and at top dead center are conveyed into the upper part of the combustion chamber by the pressure occurring in the squish surfaces. The rotational flow prevents penetration into the center of the combustion chamber. That also explains the arrangement of two spark electrodes.

The same considerations apply to British patent specification No. 1 119 298 as apply to German patent specification No. 32 24 337 as the combustion chamber, the piston crown, and the squish surfaces have the same features. In this case, at top dead center, the fresh gases are urged by way of passages to the spark electrode, and fired. The flame flashes back by way of the passages into the combustion chamber and ignites the remaining fresh gases. As the passages act as throttle means, this arrangement must be expected to involve losses in terms of pressure and power. In addition, there is a delay in regard to combustion of the whole of the fresh gases, which results in an increase in the harmful hydrocarbons in the exhaust gas.

In German patent specification No. 37 18 083 the piston crown, which is in the form of a ridge or saddle roof, does not permit an uninterrupted flow of the fresh gases. Eddy flows occur at the mutually oppositely disposed lateral trough portions, and those flows produce damaging turbulence phenomena in the central trough. Those turbulence effects are further increased by the squish flow.

U.S. Pat. No. 5,390,634 describes a combustion chamber which is disposed in the cylinder head and in the piston crown. The piston crown has an irregular portion thereon which is intended to guide the mixture and produce turbulence therein. The squish surface portions promote the eddy formation effect, like also the asymmetrical combustion chamber in the piston crown.

German patent specification No. 35 11 837 discloses a further combustion chamber in which the piston has a step configuration for which there is a corresponding cooperating contour in the cylinder chamber. The surfaces in the form of a circular ring, which are afforded by the step configuration of the piston and the cylinder chamber, serve as surfaces for defining a fresh air chamber which is provided as a buffer. An annular gap which is formed between the peripheral wall of the piston in the region of the step configuration and the corresponding inside wall of the cylinder during compression and which forms a communication from the fresh air chamber to the combustion chamber is provided as a throttle means. Therefore, the fresh gases to be compressed are retarded when they pass from the fresh air chamber into the combustion chamber.

German laid-open application (DE-OS) No. 31 07 836 discloses a piston with an annular trough 12 for collecting the fresh gases and for producing a rotational movement of those gases about the axis of the annular configuration. In this case also there is no acceleration of the fresh gases.

Patent specification No. 91 636 of the German Democratic Republic discloses guiding the fresh gases in a predetermined direction through guide passages which are comparable to guide vanes of turbines.

The Abstract of Japanese patent application No. 07 019 051 shows how fresh gases are urged inwardly between a piston and a cylinder head and are passed by a guide element into the compression chamber which is disposed in the cylinder head.

Finally the Abstract of Japanese patent application No. 61-175225 discloses a combustion chamber whose center line is arranged in displaced relationship relative to the axis of the combustion chamber in the piston crown. In other words, combustion chamber portions are arranged in mutually displaced relationship. The displaced relationship and the squish gap cause turbulence phenomena to be produced in the fresh gases in the compression chamber. There is no mixture guide element. Furthermore, the fresh gases are not guided in a circular configuration.

The object of the present invention is to satisfy the conditions set forth in the opening part of this specification and to provide a combustion chamber which, while saving fuel, has a lower level of pollution emission in relation to the fuel consumption.

The foregoing object is attained by the features of claim 1. Advantageous configurations are set forth inter alia in appendant claims 2 and 3.

In the induction stroke, the fresh gases flow tangentially into the combustion chamber through one or more inlet valves. The fresh gas temperature is reduced at the cooled cylinder wall, due to the circulatory movement, whereby better filling is achieved and a higher level of compression is possible. This results in a higher power output with a reduction in specific fuel consumption.

In the compression stroke the circulatory movement of the fresh gases is maintained by a mixture guide element on the piston crown, in which respect a circular squish surface which serves here as an accumulation or deflector surface provides for the necessary upward movement. By virtue of the squish gap at top dead center, the fresh gases are urged in a circulatory mode inwardly, they collect at the center of the combustion chamber trough, and are fired by a spark electrode arranged on the longitudinal axis of the cylinder. Due to the central arrangement of the spark electrode, the flame front can spread rapidly and uniformly in all directions, which affords a reduction in the HC-proportion in the exhaust gas.

When burning diesel oil, an injection nozzle can be provided in place of the spark electrode on the longitudinal axis of the cylinder. As injection of the diesel oil takes place primarily into the combustion chamber trough in the piston crown, in which case the fuel is deposited in the form of a thin film on the wall surface of the trough, combustion is gentler and noise emission is lower.

In operation as a lean burn engine there are to be provided at least two inlet ducts each having a respective injection valve, in which case in the induction stroke a lean mixture flows into the cylinder and a rich mixture is excluded from bottom dead center to inlet. The injection valves are operated in succession. Upon compression, due to the way in which the fresh gas is guided and due to the squish gap, the rich mixture is concentrated in a circulatory manner in the combustion chamber trough of the piston crown, and fired both an inlet duct for air and also an inlet duct for a fuel-air mixture open into a combustion chamber of a cylinder. An exhaust duct for the exhaust gases opens at the cylinder wall in such a way that this known two-stroke internal combustion engine can be scavenged by means of unidirectional or uniform scavenging. Opening and closing both of the inlet duct for the scavenging or fresh air and also the inlet duct for the fuel-air mixture is effected by way of non-controllable valves whereas the exhaust duct is opened or closed by way of the reciprocating piston. Opening of the valves is effected by virtue of the spring force of the respective valve spring being overcame by means of the medium which is introduced into the combustion chamber. A asymmtrical control diagram can be obtained with that known two-stroke internal combustion engine for the feed of the fresh mixture by virtue of control, which is not described in greater detail, in respect of the blower for the fresh air and the dimensioning of the valves. In contrast, it is only possible to provide a symmetrical control diagram for discharge of the exhaust gases, which results in an increased fuel consumption and a comparatively high level of pollutant emission.

German patent specification No. 410 695 also discloses a two-stroke internal combustion engine wherein a pressure oil-operated slider is disposed in an inlet duct for scavenging air. German patent specification No. 410 695 does not disclose whether and in what way the slider is controlled. The exhaust duct is also arranged in relation to the inlet duct in such a way that this known two-stroke internal combustion engine can be scavenged by means of uniflow scavenging. Opening and closure of the exhaust duct are effected by way of the reciprocating piston. It is also to be noted that this known two-stroke internal combustion engine is operated by means of Diesel fuel, for which purpose an injection nozzle arranged within the rotary slider injects Diesel fuel into the combustion chamber at a given time.

Finally DE 40 12 474 A1 discloses a two-stroke internal combustion engine in which both the inlet duct and also the exhaust duct can be opened and closed with a respective valve. In that case scavenging is effected by means of the cross-flow scavenging method which has the disadvantage in relation to the uniflow scavenging method that exhaust gases can rain in the cylinder, in spite of the supply of scavenging air or fresh mixture. As in addition the exhaust duct opens into the cylinder in the region of the combustion chamber, thermal problems occur in that respect.

The object of the present invention is to provide a two-stroke internal combustion engine and a method of operating a two-stroke internal combustion engine of the kind set forth in the opening part of this specification, which, with a higher degree of efficiency, permits a reduced fuel consumption and a lower level of pollution emission.

In a two-stroke internal combustion the foregoing object is attained in that the regulating element of the inlet duct is adapted to be controllable and that a regulating element which is also controllable is arranged in the mouth opening region of the exhaust duct. In this respect controllable regulating element means that the moment of opening or closing, the opening or closing time and/or the opening or closing speed can be controlled in dependence on one or more operating parameters of the internal combustion engine, in particular the rotary angular position of the crankshaft. The proposed construction makes it possible that an asymmetrical control diagram can be provided both for the inlet range and also the exhaust range, which in turn permits a particularly advantageous fuel consumption and a reduction in the level of pollution emission.

At the same time use of the uniflow scavenging method provides for particularly fast and thorough cleaning of the combustion chanter or cylinder, in respect of the exhaust gases. In addition the outlet which can be opened and closed by the controllable regulating element affords a possibility for the engine designer freely to determine the position of the exhaust duct in the cylinder wall. Thus in that way for example the exhaust duct can be moved closer to the combustion chamber so that it is possible to achieve a higher discharge flow speed for the exhaust gases and to empty the combustion chamber or cylinder of the exhaust gases more quickly. At the same time or as an alternative thereto, the outlet can be opened earlier by the controllable regulating element, in comparison with an uncontrolled outlet, so that the exhaust gases are overall cooler, thereby possibly avoiding a thermal problem which may arise. It is also to be noted that the drive for the controllable regulating elements can be produced for example by way of one or more camshafts. If those camshafts are electrohydraulically adjustable, not only is it then possible to achieve an asymmetrical control diagram, but it is also possible to provide for displacement of the entire opening time both of the inlet and also the outlet valves. The valves themselves used may be the most widely varying elements such as for example poppet or mushroon-type valves with valve elements opening into the cylinder, rotary slide or disk valves or the like. It is also to be noted that the controllable regulating element in the exhaust duct does not have to be arranged directly into the mouth opening region of the exhaust duct into the cylinder chamber, but can be disposed at a certain spacing relative thereto. In that way it is possible to avoid thermal problems for the exhaust valve, which may possibly occur, so that the amount of material used for the exhaust valve is reduced. With suitable tuning of the engine there is then the possibility of producing an additional charging effect in the feed of the fresh mixture as after closure of the exhaust duct by means of the controllable regulating element, the fresh mixture penetrates into the exhaust duct and is thrown by the closed controllable regulating element back into the combustion chamber where further fresh mixture has already accumulated. It is finally also to be noted that it is also possible only to provide one controlled regulating element for the exhaust duct and one uncontrolled regulating element for the inlet duct. If a plurality of inlet ducts are provided in that case, there is the possibility of arranging an uncontrolled or a controlled regulating element in the individual inlet ducts, for example depending on the function of the respective inlet duct.

If the inlet duct is so arranged that it opens tangentially into the combustion chamber of the cylinder, then the fresh air or the fresh mixture passes into the combustion chamber in a circling movement along the wall of the cylinder. As the cylinder wall is cooled by a suitable cooling arrangement, the fresh gases are accordingly also cooled down so that filling of the combustion chamber is improved and the compression ratio can be increased without the risk of self-ignition, which at the same time means a higher power output and a saving on fuel.

One and also two or more inlet ducts may open into the combustion chamber. If there are two inlet ducts, it is particularly advantageous if they are arranged on both sides or symmetrically relative to the longitudinal axis of the cylinder so that when the two-stroke internal combustion engine is used as a gasoline-burning internal combustion engine, the sparking plug can be arranged on the longitudinal axis of the cylinder, that is to say in the middle of the cylinder. In that respect the central arrangement of the sparking plug is advantageous as the flame front can be uniformly propagated. If the two-stroke internal combustion engine is provided as a Diesel-burning internal combustion engine, an injection nozzle can be provided in place of the sparking plug, whereby the same advantages are achieved as in the case of a gasoline-burning two-stroke internal combustion engine, in particular combustion taking place uniformly.

In addition the combustion chamber and the piston may each have a for example annular squish or squeeze surface, which surfaces are of such a configuration that there is an annular sguish or squeeze gap along the cylinder wall in the top dead center position, whereby the fresh mixture is conveyed at high speed and possibly with a circling movement into the combustion chamber, in particular into the center of the combustion chamber. That provides a high compression effect without self-ignition of the fuel-air mixture occurring. If the sparking plug is arranged centrally combustion in that arrangement can take place uniformly in all directions.

A further improvement in the efficiency of the two-stroke internalcombustion engine can be achieved by the piston being provided at its upper piston surface with a mixture guide element, preferably a raised portion or dome. Upon being compressed the fresh mixture is accelerated by the mixture guide element in the direction of the center of the correspondingly shaped combustion chamber, and there concentrated. If in its center the mixture guide element has a part-spherical or the like shaped recess which can form a part of the combustion chamber, the mixture or the fresh air can be arranged in highly concentrated manner in front of a sparking plug or an injection nozzle, The above-indicated object is attained in terms of the method in that the exhaust duct is opened or closed in dependence on an operating parameter of the internal combustion engine, in particular the rotary angular position of the crankshaft. In this case also once again it is possible to achieve an asymmetrical control diagram for the exhaust region. In this case the inlet duct way also have a controllable regulating element. Besides the operating parameter 'speed of rotation' already used in the case of four-stroke internal combustion engines, it is also possible to use other operating parameters as control values.

If at least two inlet ducts or mare are provided for the two-stroke internal combustion engine, then an injection valve can be arranged in each inlet duct. In that way it is possible to achieve a so-called layered charge in the combustion chamber, that is to say, the two-stroke internal combustion engine can be operated in such a way that, for each working stroke, firstly a lean mixture passes into the combustion chamber, in particular just before reaching the bottom dead center position, and then a rich mixture passes into the combustion chamber. A mode of operation of that kind which is referred to in the technical literature as lean-burn engines results in a high saving in terms of fuel. In this case also the fresh air or the fresh mixture can be introduced into the cylinder with a circling motion.

If the fresh mixture is accelerated by means of the piston which is moving from the bottom dead center position to the top dead center position, in particular just before reaching the top dead center position, that makes it possible to achieve a high compression effect, without in that case the temperature of the fresh mixture initially rising greatly, that is to say, it rises with a time delay. That in turn results in an increase in the power output of the two-stroke internal combustion engine.

If the two-stroke internal combustion engine is operated for example as a Diesel fuel-burning internal combustion engine, it is advantageous if the fresh air in the cylinder chamber is accumulated in the center of the combustion chamber, by means of the piston as it moves from the bottom dead center position to the top dead center position. That permits particularly gentle combustion as the Diesel fuel accumulates inter alia in the form of a thin film on the wall of the recess.

So that the amount of fresh gas or fresh air which is caused to pass into the cylinder for operation of the internal combustion engine is only as much as is required for the respective load range (idle, part load, etc), it can be provided that the amount of fresh gas required is regulated by way of a variable scavenging pressure which is set in dependence on the load applied to the internal combustion engine. That can be achieved for example by virtue of the provision in the fresh gas duct of a sensor for detecting pressure, which sensor is arranged upstream of the controllable regulating element and is connected to an electronic regulating system or control system for the internal combustion engine. In addition, it is also possible to dispose upstream of the controllable regulating element in the fresh gas duct a pressure relief valve which is controlled by the electronic control system. In dependence on the load applied to the internal combustion engine or the load transported thereby, the pressure relief valve is opened or closed by the electronic regulating system. In that way it is possible to provide for quantitative control and regulation of the amount of fresh gas supplied. That quantitative control can also be effected by the provision in the exhaust duct of a drivable throttle flap or valve which is arranged downstream of the controllable regulating element. That throttle flap is also actuated in dependence on load by a control motor or other drive, while in this case also there is provided an electronic control system which converts the load-dependent data into drive values for the drive of the throttle flap. This ensures that only as much exhaust gases pass into the open air, as fresh gases are required.

In both cases exhaust gas residues remain in the cylinder, whereby exhaust gas recycling is eliminated and thus the combustion procedure is cooler, which reduces the emission of pollution. It is also to be pointed out that the above-described possibilities may also be combined with each other.

It is also to be noted that, besides Diesel and gasoline, other gaseous fuels may also be used for the invention.

Figure 2A:
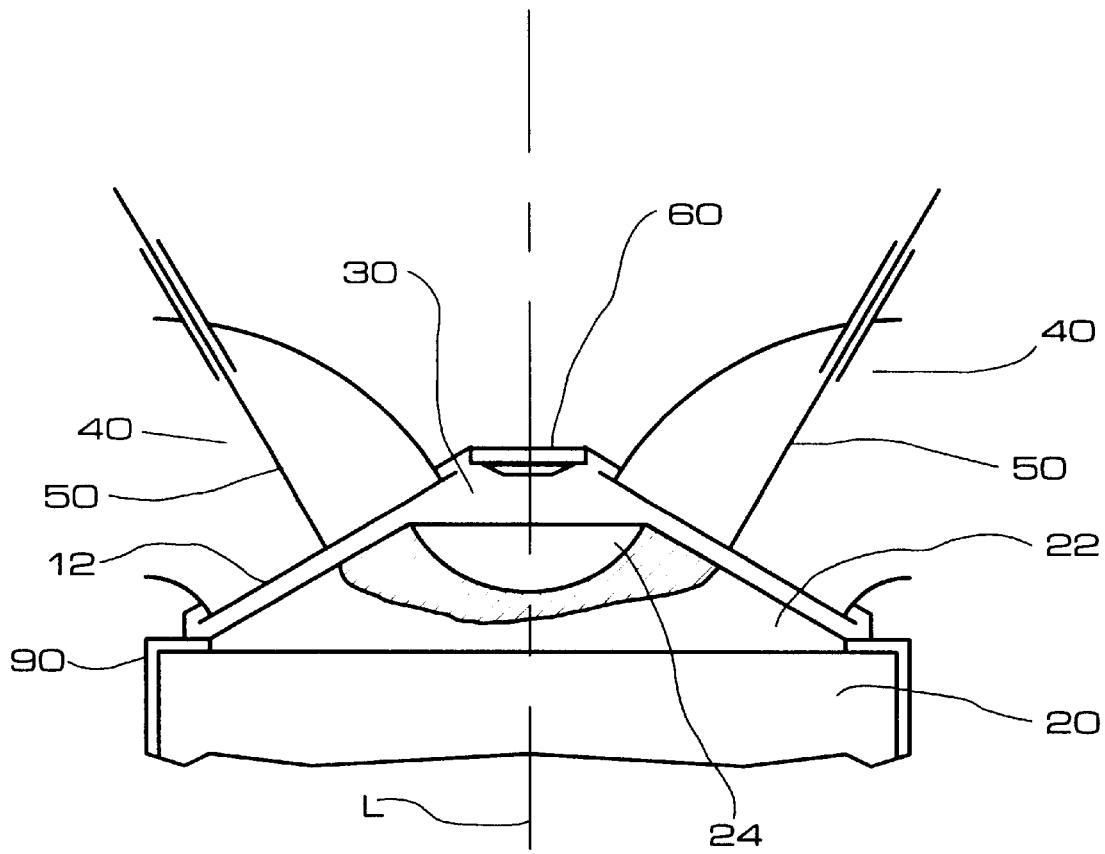
Figure 2B:
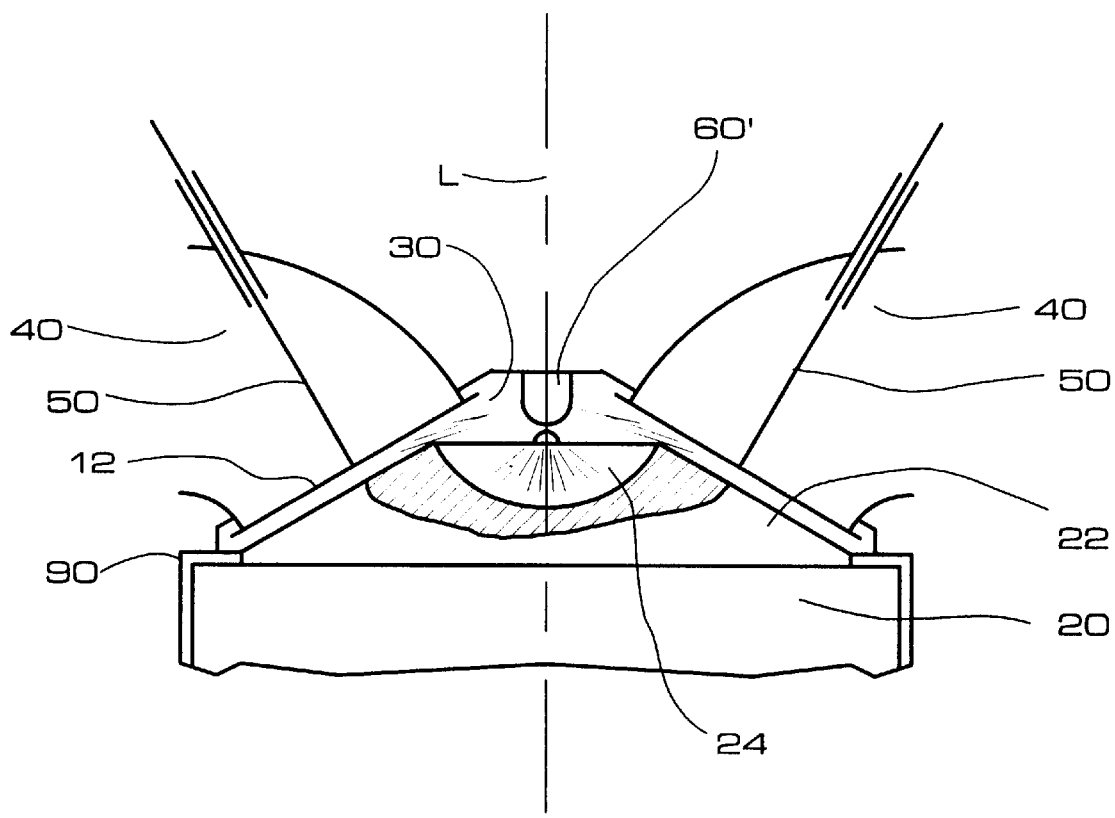
Figure 3:
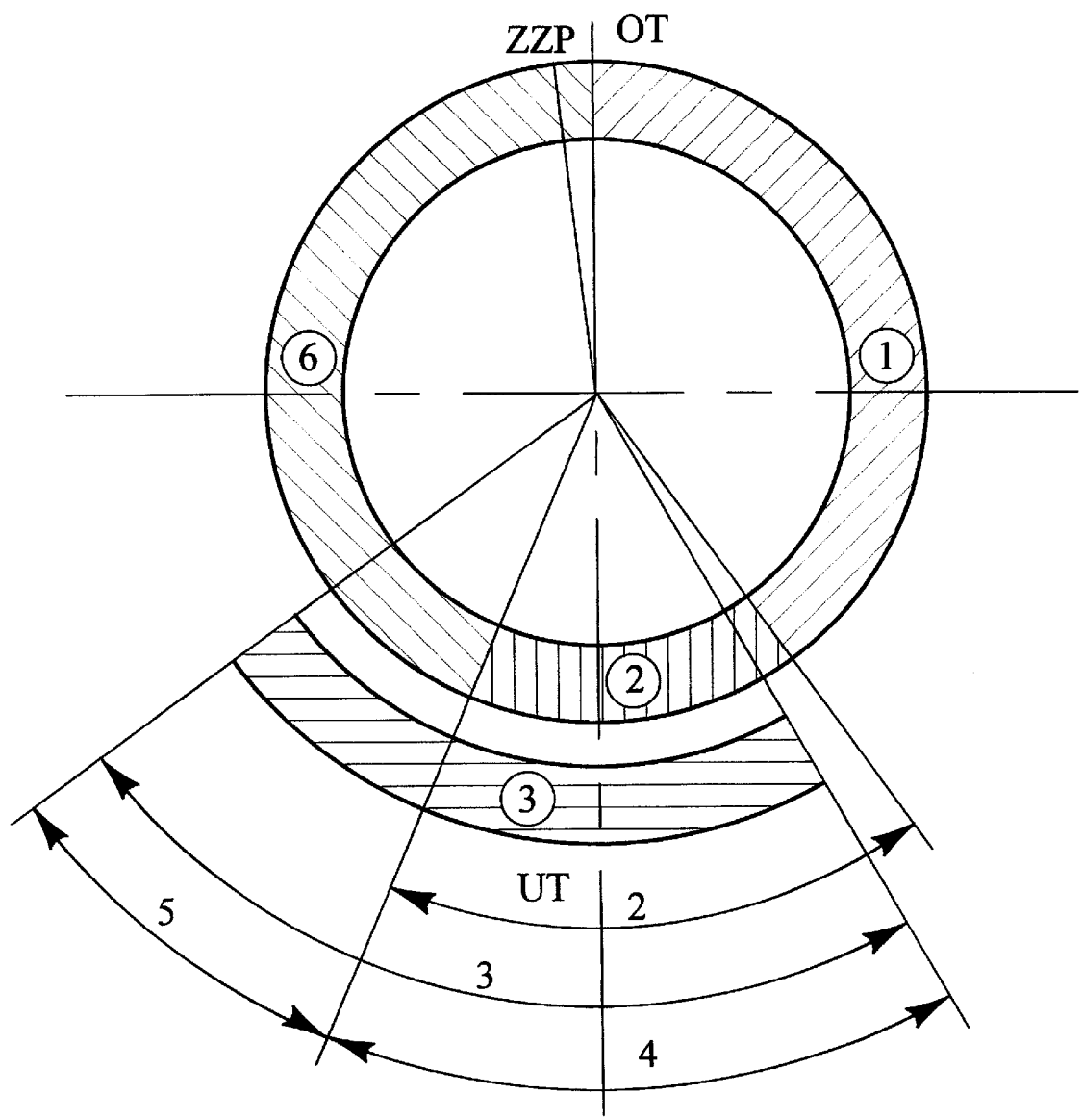
Figure 4:
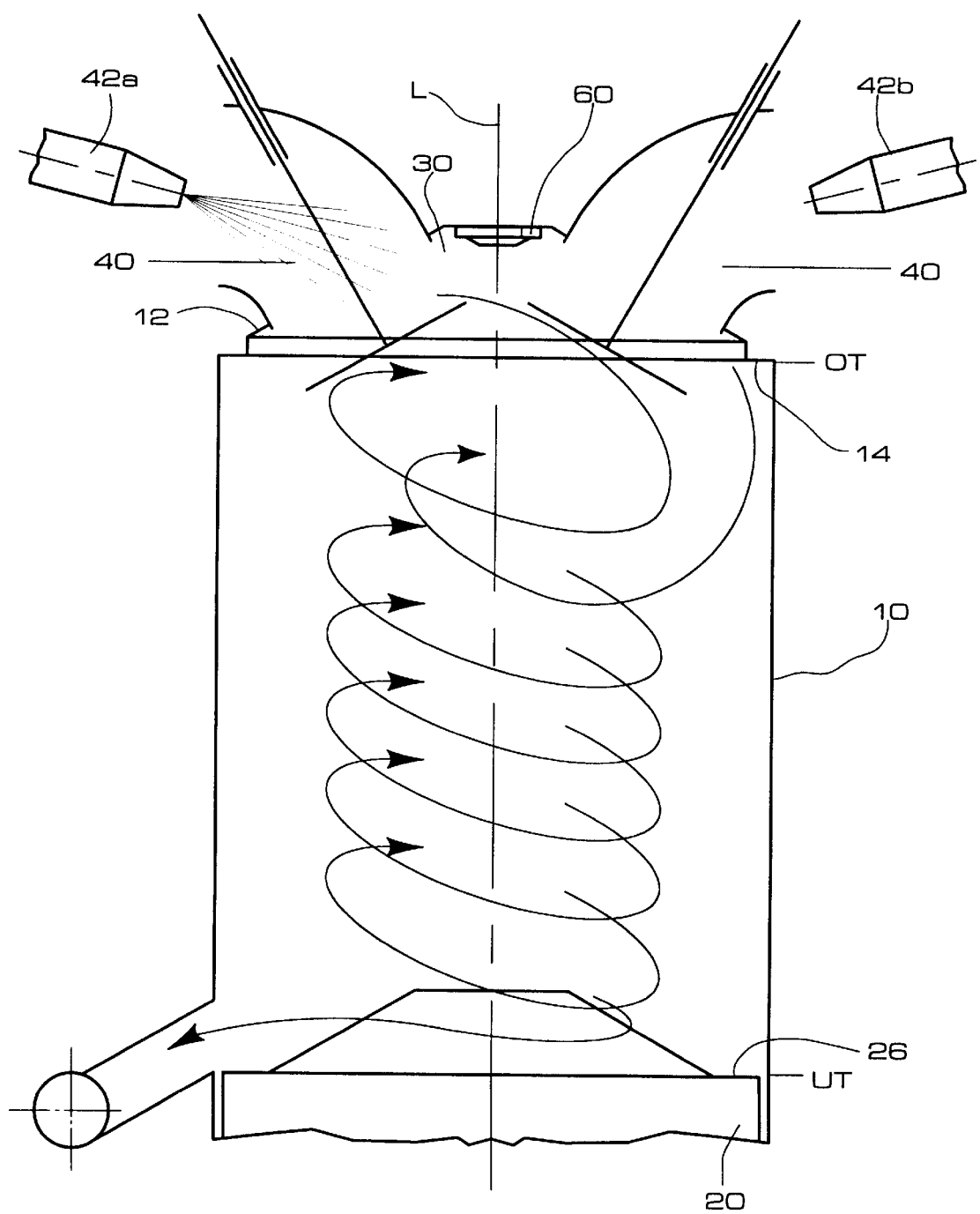
Figure 5:
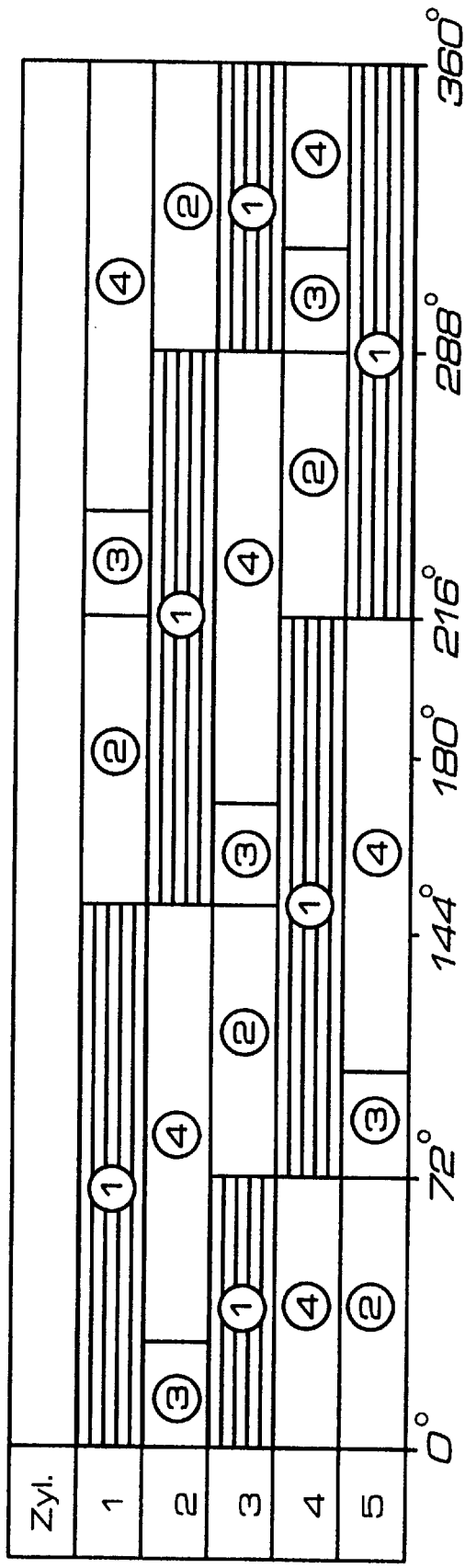

Advantageous configurations and embodiments are described hereinafter with reference to the drawings in which:

FIG. 1 is a diagrammatic view in longitudinal section through a cylinder of an internal combustion engine according to the invention, FIGS. 2a and 2b are diagrammatic partial views in longitudinal section through the combustion chamber of FIG. 1, FIG. 3 shows a control diagram for the internal combustion engine according to the invention, FIG. 4 shows a further embodiment of the internal combustion engine according to the invention, and FIG. 5 shows a working diagram for a five-cylinder two-stroke in-line engine.

In FIG. 1, reference numeral 10 denotes a cylinder and reference numeral 20 denotes a piston which can reciprocate from a bottom dead center position (=UT) to a top dead center position (=OT). Tin inlet ducts 40 open on both sides of a longitudinal axis L of the cylinder 10 into the combustion char 30 of the cylinder head 12, the combustion chamber being of a frustoconical configuration. In this case the inlet ducts 40 are so arranged that the fresh mixture issuing therefrom can pass into the cylinder 10 with a circling motion along the wall of the cylinder, as is illustrated by appropriate arrows in FIG. 1. The two inlet ducts 40 can be opened and closed by means of inlet valves 50. In this case the two inlet valves 50 are so designed that upon opening of the respective inlet duct 40 they project into the combustion chamber 30, as illustrated in FIG. 1. The two valves 50 can be pre-loaded into their closed position by means of a spring (not shown). As can be seen from FIG. 2a, sparking plug 60 can be arranged in the center of the frustoconical combustion chamber 30 in such a way that it sits on the longitudinal axis L of tie cylinder 10. Alternatively, instead of the sparking plug 60, there may be provided an injection nozzle 60', in particular a multi-hole nozzle, as can be seen from FIG. 2b. Referring to FIG. 1, disposed beneath the inlet ducts 40 is the exhaust duct 70 which can be opened and closed by way of a controllable regulating element, such as for example a valve 80. As can be seen from FIG. 1 the exhaust valve 80 is arranged at a certain spacing relative to the mouth opening region of the exhaust duct 70 into the cylinder 10. That makes it possible to avoid thermal overloading of the exhaust valve 80. As can also be seen from FIG. 1 the exhaust duct 70 is arranged relative to the two inlet ducts 40 in such a way that scavenging of the cylinder 10 is effected by means of uniflow scavenging. Both the exhaust valve 80 and also the two inlet valves 50 are respectively controllable in dependence on an operating parameter of the internal combustion engine.

As can be seen from FIGS. 2a and 2b the piston 20 is provided with a frustoconical raised portion or dome 22 which forms a mixture or fresh air guide element and the shape of which is substantially adapted to the frustoconical shape of the combustion chamber 30. Provided in the center of the frustoconical raised portion 22 is a preferably part-spherical recess 24 in which the fresh air or the mixture to be fired can be collected, opposite the sparking plug 60 or the injection nozzle 60'. In addition, as can also be seen from FIGS. 2a and 2b, formed between an annular surface 26 of the piston 20 and the cylinder head surface 14 which is opposite the piston 20 when it reaches the top dead center position is a squeeze gap 90 which displaces the fresh air or the mixture which has accumulated at that location during the compression procedure, and accelerates it through the frustoconical raised portion 22 of the piston 20 in the direction of the sparkling plug 60 or the injection nozzle 60'.

As the two inlet ducts 40 and the exhaust duct 70 are controlled by way of controllable regulating elements 50, 80 in dependence on an operating parameter of the internal combustion engine, it is possible to produce an asymmetrical control diagram, as can be seen from FIG. 3. In FIG. 3, 1 represents the working stroke of the piston, 2 represents the discharge flow of burnt gases, 3 represents the intake flow of fresh gases, 4 represents scavenging, 5 represents additional charging, and 6 represents the compression stroke of the piston.

As can be seen from FIG. 4, the fresh mixture can also be produced by means of injection of fuel into the fresh air which is supplied through the inlet ducts 40 by means of a blower (not shown). For that purpose, an injection valve 42a and 42b respectively is disposed in each of the inlet ducts 40. Instead of two inlet ducts 40 each having an injection valve 42a and 42b respectively, it is also possible to provide a single injection inlet duct 40 having a step injection nozzle (not shown). It is also possible to provide two injection valves 42a and 42b respectively in one inlet duct 40.

The mode of operation of the internal combustion engine according to the invention is described hereinafter:

In the first stroke the piston 20 is working, that is to say it moves from the top dead center position to the bottom dead center position. Before it reaches the bottom dead center position, the exhaust duct 70 is opened on the one hand by the piston 20 but also by the controllable regulating element 80. Shortly thereafter the inlet ducts 40 are opened by the two valves 50. The fresh ear or the fresh mixture which is driven by a blower can pass by way of the inlet ducts 40 into the combustion char 30, the fresh mixture or the fresh air flowing with a circling motion along the wall of the cylinder 10. In the second stroke the piston 20 is moving from the bottom dead center position to the top dead center position. In this case the exhaust duct 70 is closed both by the valve element 80 and also by the piston 20. Then the inlet ducts 40 are also closed by the valves 50 and the fresh mixture or the fresh air is compressed. Shortly before the piston reaches the top dead center position the fresh mixture is fired by means of the sparking plug 60 or, when the two-stroke internal combustion engine is operating as a Diesel-burning internal combustion engine, fuel is injected. It is to be noted that the exhaust duct 70 can be opened or closed independently of the position of the piston 20, by means of the controllable regulating element 80, that is to say, the exhaust duct 70 is already closed or opened before the piston 20 has assumed a corresponding position in the cylinder 10.

A so-called charge layering effect or layered charge can also be achieved with the two-stroke internal combustion engine according to the invention. In that case the feed of the fresh mixture occurs through the two injection valves 42a, 42b in the two inlet ducts 40. When the piston 20 moves from the top dead center position to the bottom dead center position, little fuel is added to the fresh air from the first injection valve 42a so that a lean mixture is produced. In the additional charging region, that is to say when the piston 20 is moving from the bottom dead center position to the top dead center position, a great deal of fuel is added to the incoming flow of air, by the second injection valve 42b, thus resulting in a rich mixture. By virtue of the piston 20 being of a particular configuration, the rich mixture collects in the combustion chamber 24, which is of a part-spherical configuration, of the piston 20, where it is fired by the centrally arranged sparking plug.

Instead of two injection valves 42a, 42b in each respective inlet duct 40 or in the case of a single inlet duct 40, it is also possible to use a step injection valve. Likewise two injection valves can be provided in relation to a single inlet duct.

Finally it is also to be pointed out that the drive of the control elements or valves for the inlet and exhaust ducts can be adjusted electrohydraulically, whereby the control times can be adapted to the respective requirements involved.

FIG. 5 shows a working diagram for a five-cylinder two-stroke in-line engine selected firing order of cylinders 1, 4, 2, 5, and 3. In FIG. 5, the number 1 represents the compression stroke, 2 represents scavenging, 3 represents additional charging, and 4 represents compression. It can be directly seen from this working diagram that the internal combustion engine according to the invention not only has a high level of efficiency but it is also smooth in operation as the overlap of the individual working strokes is comparatively great.

I claim:

1. A combustion chamber for a reciprocating-piston internal combustion engine having a cylinder (10) defined by a cooled cylinder wall and a cylinder head (12), a piston (20) which is reciprocal therein, at least one inlet duct (40), and at least one outlet duct (70), characterized in that the inlet duct (40) enters the cylinder (10) tangentially such that fresh gasses introduced therethrough during an induction stroke contact and circulate in the combustion chamber against the cooled cylinder wall of the cylinder (10) to reduce the temperature of the fresh gasses cylinder head (12) of the cylinder (10) and the piston (20) each have a respective annular squish surface (14, 26) for acceleration of the fresh gases, wherein adjoining a crown of the piston is a mixture guide element (22) which is symmetrical about a longitudinal axis (L) of the cylinder (10) and which is provided at a top end thereof with a recess (24) also symmetrical about the longitudinal axis (L) of the cylinder (10), which mixture guide element (22) maintains the circulatory movement of the fresh gasses during a compression stroke, and wherein the crown of piston (20) has a flat annular squish surface (26) radially outwardly of the mixture guide element (22) which moves the fresh gasses upwardly with the piston (20) and which along with a flat annular sguish surface (14) of the cylinder head (12) form a squish gap at about a top dead center position of the piston (20) which urges the fresh gasses in a circulatory mode inwardly so as to collect in the recess (24) of the mixture guide element (22) for subsequent ignition along the longitudinal axis (L) of the cylinder (10) to form a flame front which spreads radially outwardly in a uniform manner.

2. A combustion chamber as set forth in claim 1 characterized in that the mixture guide element is a frustoconical raised portion (22).

3. A combustion chamber as set forth in claim 1 characterized in that the recess (24) is of a part-spherical configuration.

4. A combustion chamber as set forth in claim 2 characterized in that the recess (24) is of a part-spherical configuration.

5. A combustion chamber for a reciprocating-piston internal combustion engine having a cylinder (10) defined by a cooled cylinder wall and a cylinder head (12), a piston (20) which is reciprocal therein and at least one inlet duct (40), and at least one outlet duct (70), characterized in that the inlet duct (40) enters the cylinder (10) tangentially such that fresh gasses introduced therethrough during an induction stroke contact and circulate in the combustion chamber against the cooled cylinder wall of the cylinder (10) generally about a longitudinal axix (L) of the cylinder (10) to reduce the temperature of the fresh gasses, wherein adjoining a crown of the piston is a mixture guide element (22) which is symmetrical about the longitudinal axis (L) of the cylinder (10) and which is provided at a top end thereof with a recess (24) also symmetrical about the longitudinal axis (L) of the cylinder (10), which mixture guide element (22) maintains the circulatory movement of the fresh gasses during a compression stroke, and wherein the crown of piston (20) has a flat annular sguish surface (26) radially outwardly of the mixture guide element (22) which moves the fresh gasses upwardly with the piston (20) and which along with a flat annular squish surface (14) of the cylinder head (12) form a squish gap at about a top dead center position of the piston (20) which urges the fresh gasses in a circulatory mode inwardly so as to collect in the recess (24) of the mixture guide element (22) for subsequent ignition along the longitudinal axis (L) of the cylinder (10) to form a flame front which spreads radially outwardly in a uniform manner.

6. A combustion chamber as set forth in claim 5 characterized in that the mixture guide element is a frustoconical raised portion (22).

7. A combustion chamber as set forth in claim 5 characterized in that the recess (24) is of a part-spherical configuration.

8. A combustion chamber as set forth in claim 6 characterized in that the recess (24) is of a part-spherized configuration.

* * * * *